United States Patent [19]
McIntire

[11] 3,720,358
[45] March 13, 1973

[54] CAR TOP CARRIER FOR SNOWMOBILES AND THE LIKE

[76] Inventor: Owen F. McIntire, P. O. Box 230, Highway 51, Mercer, Wis. 54547

[22] Filed: April 23, 1971

[21] Appl. No.: 136,885

[52] U.S. Cl..............224/42.08, 214/77 R, 214/450, 224/42.1 H
[51] Int. Cl..............................................B60r 19/02
[58] Field of Search......214/450, 451, 452, 453, 454, 214/77 R; 224/42.1 R, 42.1 H, 29, 42.08, 42.21

[56] References Cited

UNITED STATES PATENTS

| | | | |
|---|---|---|---|
| 3,519,154 | 7/1970 | Riley | 214/450 |
| 3,612,366 | 10/1971 | Schneider | 214/450 |
| 3,276,610 | 10/1966 | Thatcher | 214/77 R |
| 3,139,203 | 6/1964 | Borger | 214/450 |
| 1,288,567 | 12/1918 | Hall | 214/16.1 DA |
| 3,515,323 | 6/1970 | Gilbert | 224/42.08 |

Primary Examiner—Gerald M. Forlenza
Assistant Examiner—John Mannix
Attorney—Wolfe, Hubbard, Leydig, Voit & Osann

[57] ABSTRACT

A carrier for transporting a snowmobile on top of an automobile includes a support deck which is mounted on a slant generally over the trunk of the automobile and is supported pivotally at its front end by a bracket attached to the rain gutters. The back end of the deck rests over the trunk and upon an upstanding support attached to the rear bumper. A loading boom is mounted on the support to pivot between pickup and load positions by means of an actuator and includes a sling for carrying the snowmobile up onto the deck as the boom is pivoted from the pickup position to the load position. A lifter also mounted pivotally on the support is positioned to engage the underside of the deck and is operable to raise the latter into a substantially level position in order to gain access to the trunk.

10 Claims, 6 Drawing Figures

PATENTED MAR 13 1973
3,720,358
SHEET 1 OF 3
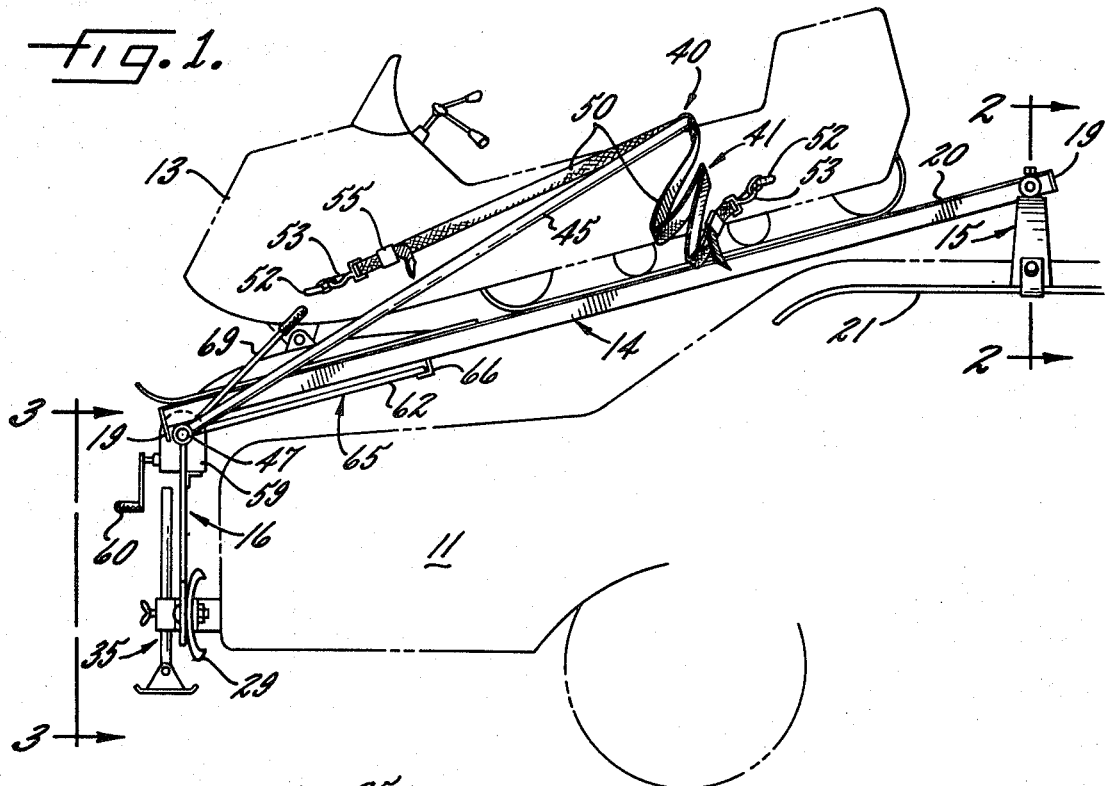
Fig. 1.
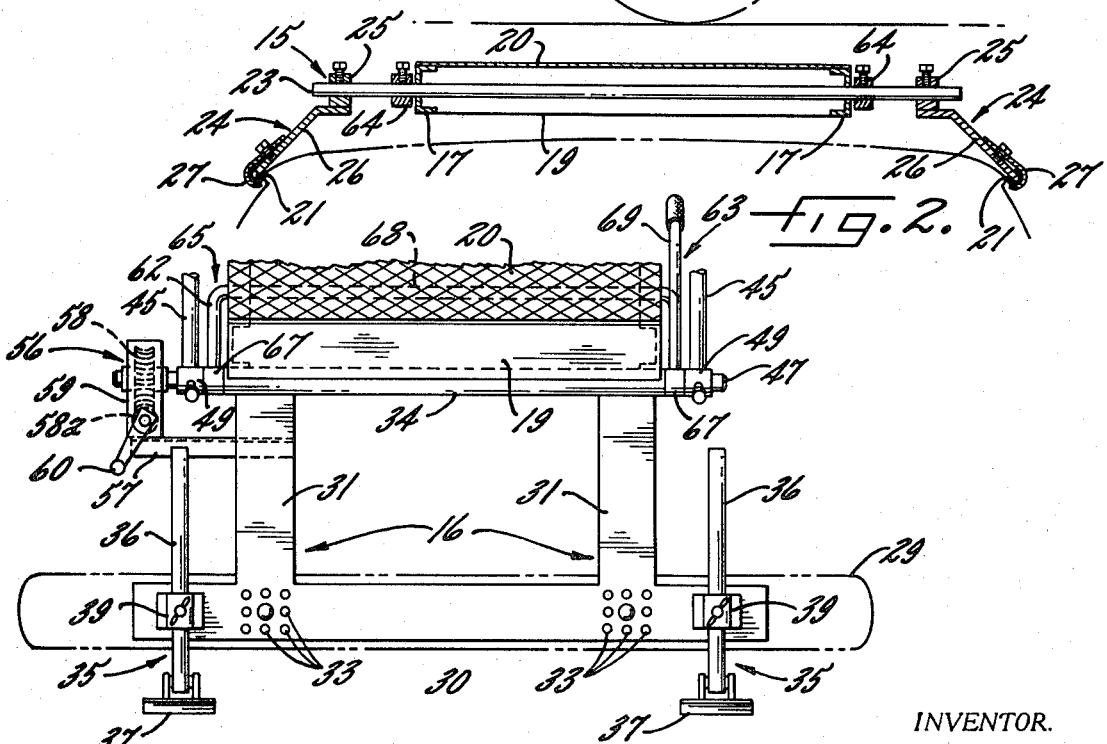
Fig. 2.
Fig. 3.
INVENTOR.
OWEN F. McINTIRE,
BY
Wolfe, Hubbard, Leydig, Voit & Osann, Ltd.
ATTORNEYS.

INVENTOR.
OWEN F. McINTIRE,
BY
Wolfe, Hubbard, Leydig, Voit & Osann, Ltd.
ATTORNEYS.

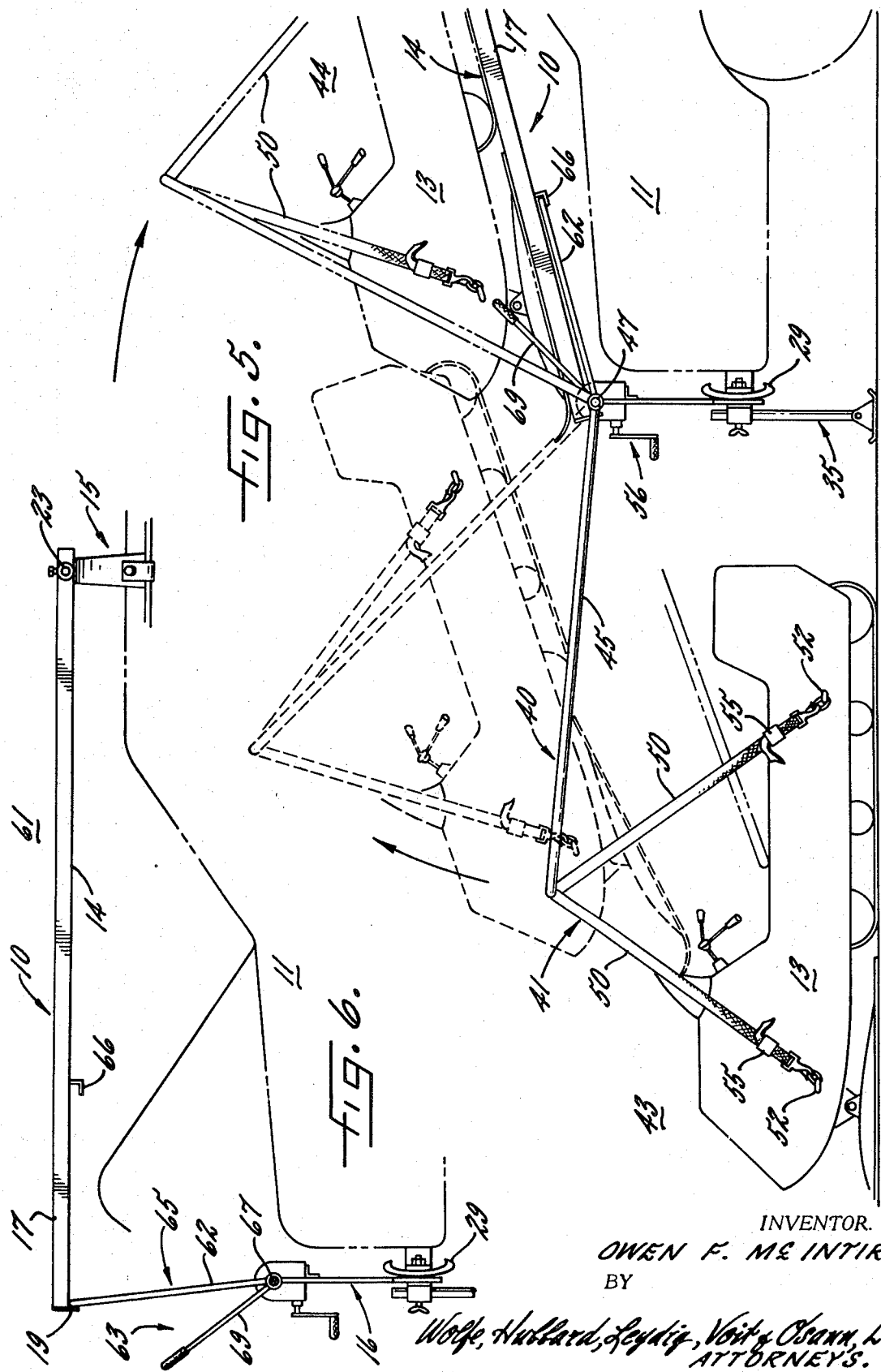

CAR TOP CARRIER FOR SNOWMOBILES AND THE LIKE

BACKGROUND OF THE INVENTION

This invention relates generally to carriers for transporting articles on top of automotive vehicles and, more specifically, to carriers used to transport articles such as snowmobiles on top of automobiles. Typical carriers of this SUMMARY OF THE INVENTION deck with front and back end supports for attaching the carrier across the top of the automobile. In some instances, the front support is fastened to the rain gutters on each side of the automobile and the back support is fastened to the rear bumper. In this position, the deck slopes downwardly from the top of the automobile and over the trunk. A carrier of this general type is shown in Townsend, U.S. Pat. No. 3,527,371 and supports a snowmobile which is positioned on the support deck to face rearwardly of the automobile.

Summary of the invention

The general object of the present invention is to provide a car top carrier of the above character which is simpler in construction and is especially adapted for much quicker and easier loading and unloading of an article than is possible with prior carriers of the same general type. More particularly, provision is made of a unique carrier with a loading boom to which the article may be attached quickly and easily so that the latter may be lifted bodily from the ground and onto the deck to greatly simplify the loading operation.

A further object is to facilitate the quick and simple loading operation by adapting the carrier to load the article from substantially any position within a defined area behind the automobile rather than requiring the article be located in a specific position relative to the carrier. This is a distinct advantage over previous carriers which use loading ramps or other means that require the article to be oriented in one certain position relative to the loading means preparatory to loading.

An additional object is to adapt the carrier to hold the article being loaded in a suspended position between the ground and the deck in order to gain easy access to the underside of the article for servicing.

Another important object is to enable the carrier to be moved out-of-the-way for easy access to the trunk without need of taking the carrier off the automobile.

The invention also resides in the novel and simplified construction and arrangement of the carrier for enabling the carrier to lift the article onto the deck and to positively hold the article on the deck during transit.

These and other objects and advantages will become more apparent from the following detailed description when taken in conjunction with the accompanying drawings.

BRIEF DESCRIPTION OF THE DRAWINGS

FIG. 1 is an elevational view of a carrier embodying the principles of the present invention with the carrier shown mounted on an automobile.

FIG. 2 is an enlarged fragmentary cross-sectional view taken substantially along line 2—2 of FIG. 1 with the roof of the automobile shown in phantom.

FIG. 3 is a fragmentary end elevational view of the carrier taken substantially along line 3—3 of FIG. 1 with the rear bumper of the automobile shown in phantom.

FIG. 5 is an elevational view similar to FIG. 1 but showing the snowmobile as it is moved through successive loading steps.

FIG. 6 is an elevational view of the carrier but with parts removed, and showing the support deck lifted into an out-of-the-way position so that access may be gained to the trunk.

DETAILED DESCRIPTION OF THE PREFERRED EMBODIMENT

Figure 4:
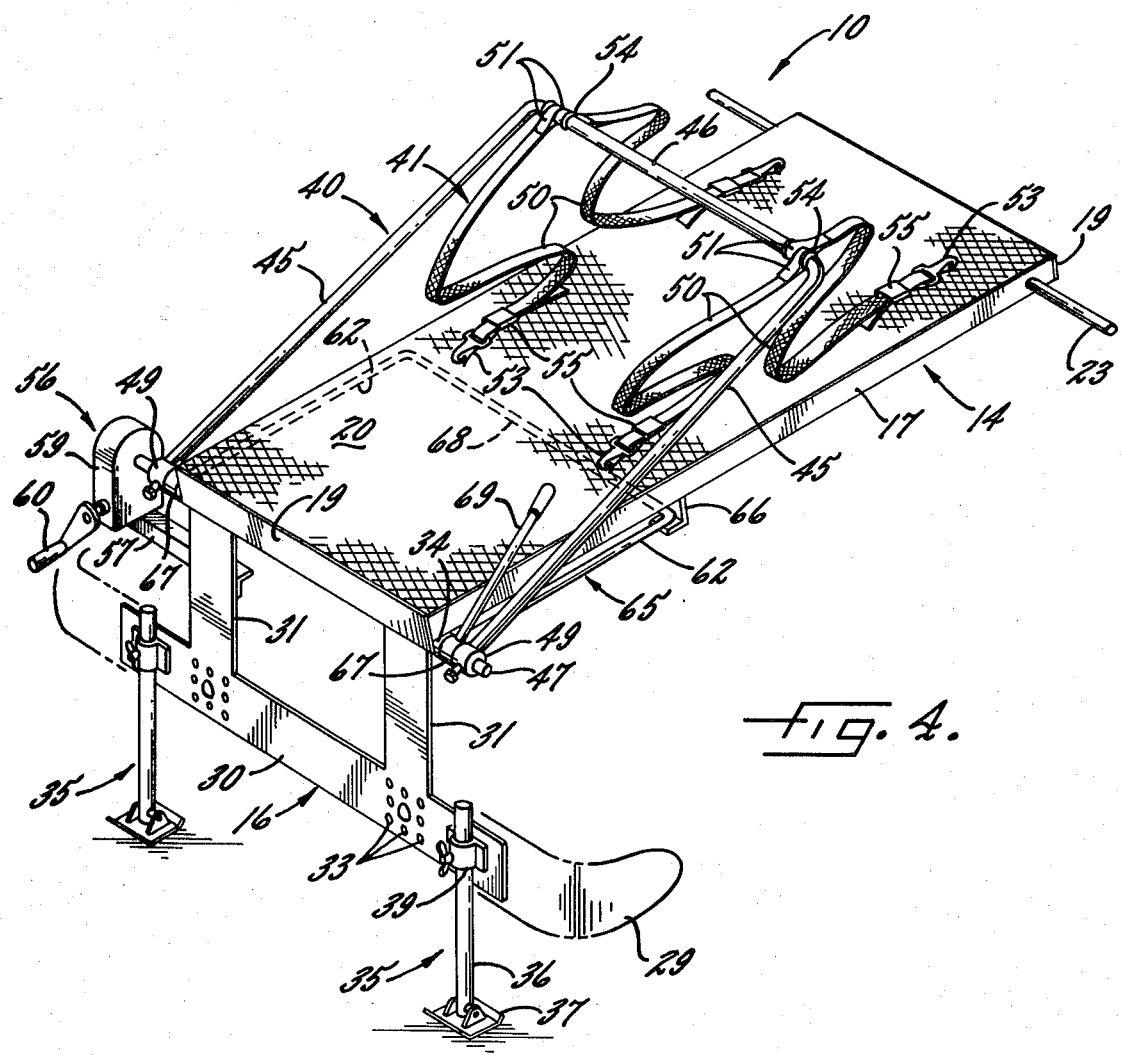
FIG. 4 is a perspective view of the carrier with the automobile and snowmobile removed for clarity.

The present invention is embodied in a carrier 10 for use in transporting an article on top of an automotive vehicle. For purposes of illustration, the carrier is shown in the drawings mounted on an automobile 11 and carrying a single snowmobile 13. It will be appreciated, however, that other articles and even two snowmobiles could be transported with the carrier and that the carrier could be used equally well on a wide variety of automotive vehicles. Preferably, the snowmobile is supported on an incline over the trunk of the automobile to maintain a low center of gravity and thereby obtain a stable carriage position. Herein, the snowmobile rests upon a generally rectangular support deck 14 having its front end fastened to the roof by a bracket 15 and its back end supported just above the trunk by an upstanding rear support 16. In order to keep the carrier as lightweight as possible, the deck is constructed as a rectangular frame with two parallel side channels 17 spanned by crosspieces 19 at each end and covered by an expanded metal sheet 20 upon which the snowmobile rests.

The bracket 15 (FIG. 2) bridges the roof of the automobile and is fastened to the rain gutters 21. As shown, the bracket includes an elongated support rod 23 with a clamp 24 attached to each end thereof for fastening to the rain gutters. A sleeve 25 on each of the clamps is telescoped over the rod end and is held thereon by a set screw. An angled brace 26 welded to the bottom of each sleeve extends into the trough of the rain gutter and is clamped against the bottom thereof by a J-shaped catch 27. The latter fits around the outer side of the gutter and is held thereagainst by a second set screw which acts to draw the brace and catch together.

Supporting the back end of the deck 14 is the rear support 16 which is attached to the rear bumper 29 of the automobile 11 and extends upwardly therefrom past the top of the trunk thereby providing clearance between the bottom side of the deck and the automobile. As shown in FIG. 3, the rear support comprises an elongated connector plate 30 bolted lengthwise on the rear bumper preferably with the same bolts that are used to bolt the bumper to the automobile. Several bolt holes 33 are drilled in the plate to accommodate variations in automobile bumpers. Two legs 31 integrally formed with the connector plate and spaced from each other and equally from the ends of the plate extend upwardly from the plate and bumper and are connected at their upper ends by a pipe 34. The latter is welded to the ends of the legs and is positioned to engage the underside of the back end of the deck for support purposes.

To provide added support for the rear springs of the automobile 11 as the snowmobile 13 is loaded and unloaded on and off the support deck 14, an adjustable support standard 35 is mounted on each end portion of the connector plate 30. Herein, each standard includes a vertically adjustable post 36 with a pivoted foot 37 for engagement with the ground to provide a solid footing for the standard. The post is slidable through a U-shaped bracket 39 which is fastened to the connector plate and a winged set screw holds the post vertically in the bracket and provides the means for vertical adjustment.

In accordance with the present invention, the carrier 10 includes a loading boom 40 which is used to easily and quickly load and unload the snowmobile 13 on and off the deck 14 and to hold the loaded snowmobile securely on the deck during transit. For these purposes, a sling 41 is attached to the free end of the boom and is adapted to be connected with the snowmobile to swing the latter onto the deck as the boom is pivoted between a pickup position 43 (FIG. 5) and a load position 44. Once the snowmobile is loaded, the boom is pivoted further until the free end thereof is pressed against the snowmobile to hold it down on the deck and tension in the sling holds the snowmobile from sliding rearwardly off the deck.

In the present instance, the boom 40 is mounted pivotally on the rear support 16 for movement between the pickup and load positions 43 and 44 and includes two parallel side members 45 which are spanned at their free ends by a crosspiece 46. As shown in FIGS. 3 and 4, the side members are spaced from each other a distance greater than the width of the support deck 14 and are mounted on an elongated shaft 47 extending through and journaled in the pipe 34. A collar 49 attached to the mounted end of each side member is telescoped over the shaft, and set screws extending through the collars hold the boom for movement with the shaft as the latter is turned within the pipe thereby to pivot the boom between its pickup and load positions. Thus, the side members are mounted pivotally on the rear support with the end of each side member adjacent one end of the pipe so that the end portions of the side members are pivoted adjacent the sides of the support deck.

As shown in FIG. 4, the sling 41 is formed of four flexible straps 50 which include looped end portions 51 that fit around the crosspiece 46. Snaps 53 fastened to the other end portions of the straps are adapted for detachable connection to the snowmobile. Two of the straps are fastened adjacent each end of the crosspiece and are held against sliding along the crosspiece by collars 54. Two eye bolts 52 are located on each side of the snowmobile (FIG. 1), one toward the front of the snowmobile and one toward the rear, with one of the straps to be clipped to each of the eye bolts by means of the snaps. Thus, the snowmobile is carried by the four straps, two of which are fastened to opposite sides of the snowmobile adjacent the rear of the snowmobile and the other two of which are fastened to the opposite sides but adjacent the front of the snowmobile.

To complete the loading operation once the straps 50 have been fastened to the snowmobile 13, the boom 40 is pivoted upwardly thereby to draw the straps taut, as shown in FIG. 5, and continued pivoting of the boom causes the snowmobile to be picked up from the ground, swung between the side members 45 and lowered onto the support deck 14. If before being picked up the snowmobile is not aligned lengthwise with the deck, the weight of the snowmobile acting through the straps as they are drawn taut will cause the snowmobile to be turned bodily lengthwise into an aligned position. Then, when finally lowered onto the deck, the snowmobile will not be in a skewed position relative to the deck. Thus, it is seen that the sling arrangement is of particular advantage because the snowmobile need not be positioned directly in line with the deck preparatory to loading. All that need be done is to drive the snowmobile up behind the automobile 11 into any rearwardly facing position in which the straps can be clipped to their respective eye bolts 52. Then, as the snowmobile is picked up, it is turned automatically to line up with the deck.

As the boom 40 is moved during loading to lift the snowmobile 13, the latter assumes a particular angular orientation at the end of the straps 50 before being swung between the side members 45 and onto the deck 14. In this orientation, the front end of the snowmobile is lower than the back end so that the underside of the snowmobile substantially parallels the incline of the deck 14 as shown in dotted lines in FIG. 5. Thus, as the boom approaches its load position, the snowmobile is lowered flat onto the deck. Since angular orientation of the snowmobile depends upon the relative lengths of the straps 50, adjusters 55 (FIG. 4) are provided at each snap end of the strap for shortening or lengthening the straps individually as is found to be necessary in order to maintain the lifted snowmobile in the preferred angular orientation. The adjusters are of added benefit in that they allow the straps to be adjusted to accommodate different sizes of snowmobiles and to compensate for stretch in the straps.

To move the boom 40 between its pickup and load positions 43 and 44, an actuator 56 (FIG. 3) is operably connected to one end of the shaft 47 to turn the latter and thereby pivot the boom. Herein, the actuator is carried on one of the legs 31 by means of an angle iron 57 and includes a gear box 59 which is mechanically connected to the end of the shaft and is driven by a crank handle 60. Thus, when the crank handle is turned, the shaft is also turned thereby to move the boom between its pickup and load positions.

Advantageously, the actuator 56 includes a worm wheel 58 (FIG. 3) connected to the shaft 47 and meshing with a worm 58a which is connected to and rotated by the crank 60. Thus, when the crank is turned, the worm and the worm wheel rotate the shaft which, in turn, moves the boom 40 between its pickup and load positions 43 and 44. Since the worm wheel will not turn the worm if torque is applied to the shaft 47, the boom can be stopped and held in any position between the pickup and load positions without need of a lock or other holding device. As a result, the boom can be used as a hoist to lift and suspend the snowmobile 13 in midair thereby to enable the underside of the snowmobile to be easily serviced. Furthermore, once the snowmobile is lifted onto the deck 14, the worm and worm wheel hold the boom stationary with the crosspiece 46 pressed down against the snowmobile (see FIG. 1) to prevent the latter from bouncing around on the deck during transit. In this position, the forward straps 50 are stretched taut and thereby act to prevent the snowmobile from sliding rearwardly off the deck.

To unload the snowmobile 13, the loading operation is simply reversed with crank 60 being turned to pivot the boom 40 counterclockwise as viewed in FIG. 5. Because the snowmobile is carried in the angular orientation as it swings between the side members 45, the front skids first engage the ground and then slide across the surface thereof until the back end of the snowmobile reaches the ground. Thereafter, continued pivoting of the boom slackens the straps 50 so that they may be unclipped from the eye bolts 52 before the snowmobile is driven away.

Thus, it is seen that the present invention provides a new and novel carrier 10 which is particularly adapted for quick and easy loading and unloading of the snowmobile 13 whereby the snowmobile is flexibly suspended from the end of the boom 40 and the latter is pivoted to swing the snowmobile on or off the support deck 14 of the carrier as desired. Once the snowmobile is loaded, it is held on the deck by tension in the forward straps 50 which prevents the snowmobile from sliding off the deck and by the clamping action of the crosspiece 46 against the snowmobile whereby the latter is held normally against the deck.

As shown in FIG. 1, the preferred mounting position of the carrier 10 locates the deck 14 just above the trunk of the automobile 11. In accordance with another aspect of the present invention, the carrier is easily and quickly moved to an out-of-the-way position 61 (FIG. 6) in order to enable the trunk of the automobile to be opened fully without removing the carrier from the top of the automobile. For this purpose, the back end of the support deck simply rests on top of the rear support 16 and the front end of the support deck is mounted pivotally on the bracket 15. This enables a lifter 63 to engage the deck and raise the back end thereof until the deck reaches and is held in a substantially horizontal position so that the trunk lid can be opened.

In the present instance, the front end of the deck 14 is pivotally mounted on the support rod 23 as shown in FIG. 2 with the rod extending through the side channels 17. Retainer rings 64 adjacent the outer side of each channel are held on the rod by set screws to prevent the deck from sliding along the rod. At the back end of the deck, the rear end portions of the side channels rest on top of the cross pipe 34 of the rear support 16 to support the deck in its normal or inclined position. A downward extension or lip formed on the lower edge of the rear crosspiece 19 acts as a catch to engage the rear side of the pipe as shown in FIG. 4 and hold the back end of the deck from sliding forwardly of the rear support in the event the automobile is required to stop suddenly when carrying the snowmobile. With this arrangement, the rear end portion of the deck may be lifted off the rear support with the front end of the deck pivoting around the support rod 23 until the deck is raised into is substantially horizontal position so that the trunk lid may be opened as shown in FIG. 6.

Herein, the lifter 63 is used to raise the deck 14 into its out-of-the-way position and to hold the deck in that position. For these purposes, the lifter comprises a U-shaped member or bail 65 with legs 62 pivotally mounted on the shaft 47 and a bridge 68 extending between the legs to form the closed end of the bail.

More particularly, the bridge is disposed beneath the deck and rests on a keeper 66 (FIG. 1) which is mounted on the underside of one of the channels 17. Welded to the pivotal end of each leg is a sleeve 67 which is rotatably mounted on the shaft with the bail legs positioned on opposite sides of the deck so that the sleeves are located between the ends of the pipe 34 and the collars 49 on each end of the side members 45 as shown in FIG. 3.

Fastened to one of the sleeves 67 in an elongated handle 69 (FIG. 5) which when turned counterclockwise acts to pivot the lifter 63 about the shaft 47 whereby the bridge 68 of the bail 65 slides across the underside of the channels 17 to lift the deck 14 off the pipe 34 and eventually into the out-of-the-way position 61. In this position, the bridge rests against the downward extension of the rear crosspiece 19 in an angular position rearwardly of a vertical plane through the shaft, as shown in FIG. 6, thereby to hold the deck in a substantially level position so that the trunk lid can be opened and access gained to the trunk. To lower the deck into its normal position, the handle is rotated in a clockwise direction until the closed end of the bail once again catches in the keeper 66.

From the foregoing, it will be apparent that the present invention provides a new and improved car top carrier 10 which is particularly advantageous in that the snowmobile 13 can be loaded on the support deck 14 much more quickly and easily than with previous arrangements. This advantage is achieved through the novel use of a pivoted boom 40 and a sling 41 whereby the snowmobile is bodily picked up and swung up onto the support deck. Another unique feature of the present invention resides in the lifter 63 which is used advantageously to lift the deck to an out-of-the-way position 61 without the need of taking the carrier off the automobile thereby allowing the trunk lid to be opened to gain access to the trunk.

I claim as my invention:

1. A carrier for transporting an article on top of an automotive vehicle, said carrier including a support deck with front and back ends, a bracket for mounting the front end of said deck on top of said vehicle, means adapted to be fastened on the rear of said vehicle for engagement with the back end of said deck to provide support therefor, a vertically pivotable boom mounted on said vehicle and movable between pickup and load positions, an actuator connected to said boom and operable to pivot said boom between said positions, means for fastening the article to the free end of said boom for movement therewith as the boom is moved between said positions to load and unload the article onto and off of said deck, said means coacting with said boom and serving to hold said article on said deck once the article has been loaded.

2. A carrier as defined in claim 1 wherein said article fastening means includes a sling connected to the free end of the boom and suspending the article from the boom.

3. A carrier as defined in claim 2 in which the front end of the support deck is pivotally attached to the bracket and the back end of the support deck rests on said support means whereby said deck is supported in a normally lowered position relative to the rear of the vehicle, said carrier further including a lifter adapted to lift the back end of said deck into a raised position as the front end is pivoted on the bracket, said lifter being further adapted to support said deck in said raised position in order to allow access to the trunk of the vehicle.

4. A carrier as defined in claim 3 including a catch for holding said deck in engagement with said support means to keep said deck from sliding off the support means.

5. A carrier as defined in claim 4 in which said catch is a lip mounted on the underside of the deck to engage said support means when the deck is in its lowered position to prevent the deck from sliding forwardly off the support means, and said lifter including a U-shaped bail having legs pivotally mounted on said support means and having a bridge engageable with the underside of the deck and engageable against said lip to hold the deck in its raised position.

6. A carrier as defined in claim 2 in which said sling includes a plurality of flexible straps each with one end fastened pivotally to the free end of the boom and with the other end adapted to be connected to the article thereby to suspend said article from the free end of the boom.

7. A carrier as defined in claim 6 wherein said support means includes a shaft, said boom including two side members spanned at their free ends by a crosspiece, said side members being mounted on said shaft adjacent opposite sides of said deck, said straps being fastened to said crosspiece and said article to swing between said side members as said boom is pivoted to load and unload the article.

8. A carrier as defined in claim 7 wherein four of said straps are used with two of the straps positioned adjacent each of said side members for fastening to opposite sides of said article at spaced positions along said opposite sides so as to stabilize said article as the boom is pivoted between its pickup and load positions, said straps each including an adjuster for varying the length thereof.

9. A carrier as defined in claim 8 wherein said actuator is a crank which is mechanically connected to said boom and includes means for stopping said boom between said pickup and load positions thereby suspending said article in mid-air for servicing the underside of the article.

10. A carrier for transporting an article on top of an automotive vehicle, said carrier including a support deck with front and back ends, a bracket connected to said deck and pivotally supporting the front end thereof on the top of said vehicle, means mountable on the rear of said vehicle for engagement with the back end of said deck to provide support therefor, a boom having two side members and a crosspiece spanning said side members, said side members being pivotally mounted on said support means and extending along opposite sides of said deck, said boom being pivotable between pickup and load positions, an actuator connected to said boom and operable to pivot the boom between said pickup and load positions, a sling including a plurality of straps each with one end fastened pivotally to said crosspiece and with the other end adapted to be connected to the article thereby to suspend said article from the free end of the boom as the boom is pivoted between its pickup and load positions to load and unload the article onto and off of said deck, said boom coacting with said sling and engaging said article to hold the latter on said deck once the article has been loaded, and a lifter mounted on said means and engageable with the back end of said deck to lift the latter from a normally lowered position and into a raised position and to support said deck in the raised position to allow access to the trunk of the vehicle.

* * * * *